(No Model.)
A. NOLL.
CONDUIT FOR ELECTRIC CONDUCTORS.
No. 481,913. Patented Aug. 30, 1892.
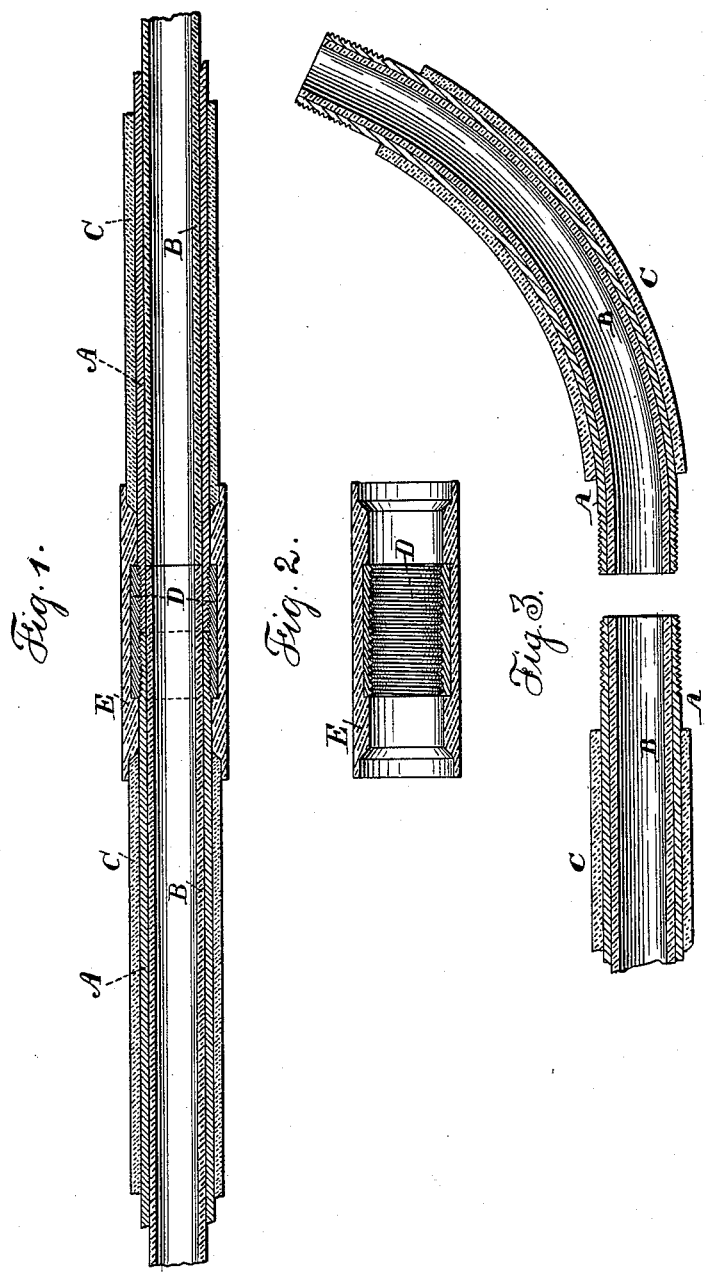
Witnesses:
J. Staib
Chas H Smith
Inventor:
Augustus Noll
per Lemuel W. Serrell
Atty

UNITED STATES PATENT OFFICE.

AUGUSTUS NOLL, OF MOUNT VERNON, NEW YORK, ASSIGNOR TO ABNER J. TOWER, TRUSTEE, OF BOSTON, MASSACHUSETTS.

CONDUIT FOR ELECTRIC CONDUCTORS.

SPECIFICATION forming part of Letters Patent No. 481,913, dated August 30, 1892.

Application filed April 28, 1892. Serial No. 431,011. (No model.)

*To all whom it may concern:*

Be it known that I, AUGUSTUS NOLL, a citizen of the United States, residing at Mount Vernon, in the county of Westchester and State of New York, have invented an Improvement in Conduits for Electric Conductors, of which the following is a specification.

In my present improvements I construct a conduit for insulated electric conductors of metallic tube sections permanently fastened together, there being an exterior insulating tubular case and an interior insulating tubular lining, the object being to obtain great strength and lightness in the conduit and to connect up the metal tubes, so as to form the metallic connection or second side of the circuit, and by making use of insulating material that is not imflammable the conduit is rendered substantially fireproof and the return or second side of the circuit offers but little resistance to the electric current, and the conductors within the conduit are effectually protected not only from leakage or grounds, but also from induction when used in telephone-circuits.

In the drawings, Figure 1 is a longitudinal section of my improved conduit. Fig. 2 is a separate section of the joint or coupling, and Fig. 3 is a section of adjacent ends of the metal tube and lining.

The metallic tubes A are of a proper diameter, according to the electric conductors that are to be received within the conduit, and such metal tubes A are of lengths adapted to the places where they are to be used, and such metal tubes A are made with an insulating-lining B, of suitable material that is adapted to adhere firmly to the metal—such, for instance, as india-rubber and asbestus or other fibrous material and sulphur applied inside the tube and vulcanized so as to adhere firmly to the metal of the tube—and the insulating casing or covering C is of a material that is not inflammable, so as to render the conduit substantially fireproof, which coating may be of fibrous material, with the interstices filled and the fiber covered with a fireproof material—such as a pigment or oxide and a drying oil or silicate of soda—and the conduit made of the metal tubes with the insulating-lining and the insulating-covering is adapted to use in the wiring of buildings, ships, or other structures, and the risk of the electric circuit being short-circuited or grounded is reduced to a minimum.

In joining up the metal tubes forming the conduit it is preferable to cut upon the ends of such metal tubes screw-threads and to provide screw-couplings or thimbles D, into which the ends of the metal tubes A are screwed, so as to unite the metal tubes firmly together, and it is advantageous to cover the thimbles or couplings D with insulating material, as at E, which covering can project beyond the ends of the coupling and surround the metal tubes of the conduit for the desired distance, and insulating-cement may be employed between the insulating-covering E and the insulating-casing C of the tubes. The insulating-lining B may terminate at the end of each metal tube, as seen in Fig. 3, so that the linings will abut closely against each other when the tube ends are screwed into the coupling-thimbles, or the insulating-lining of one tube may project so as to pass into the end of the next metal tube and abut against the lining thereof, as seen in Fig. 1.

It is to be understood that this conduit can be made of tube-sections of any desired length, screwed or otherwise connected together, and the screw-threads upon the ends of the tubes can be cut before the insulating material is applied, or if the screw-thread is cut afterward the insulating material can be stripped off and the screw-thread cut upon the metal tube by any suitable tools, and while it is advantageous to employ screw couplings or thimbles, I do not limit myself in this particular, as the metal thimbles may receive the ends of the metal tubes as slip-joints, and the couplings may each be connected at one end by solder or otherwise to the metal tube.

Bends or elbows may be provided at the ends of the tube-sections or where one tube stands at an angle to another tube or section in the conduit, as illustrated in Fig. 3.

I claim as my invention—

1. The conduit for electric conductors, composed of a metal tube with a lining of insulating material adhering to the inside of the metal tube and a casing or covering of insulating material, substantially as set forth.

2. The combination, in a conduit for electric conductors, of metallic tubes lined with insulating material that adheres to the metal of the tubes and coated with insulating material and metallic couplings connecting the metallic-tube sections, substantially as set forth.

3. The combination, in a conduit for electric conductors, of metallic-tube sections lined with an insulating material and covered with an insulating-coating, and metallic screw-couplings for uniting the metallic-tube sections and an insulating-covering upon the outside of each screw-coupling, substantially as set forth.

Signed by me this 19th day of April, 1892.

AUGUSTUS NOLL.

Witnesses:
GEO. T. PINCKNEY,
WILLIAM G. MOTT.